United States Patent

Kawasaki et al.

Patent Number: 4,592,756
Date of Patent: Jun. 3, 1986

[54] DYE SOLUTION COMPOSITION

[75] Inventors: Sinjiro Kawasaki, Nishinomiya; Hideo Kitagawa, Kyoto; Yutaka Nishii, Moriguchi, all of Japan

[73] Assignee: Taoka Chemical Company, Limited, Osaka, Japan

[21] Appl. No.: 698,706

[22] Filed: Feb. 6, 1985

[30] Foreign Application Priority Data

Feb. 9, 1984 [JP] Japan ................. 59-24137

[51] Int. Cl.$^4$ ............... C09B 67/00; C09D 11/00
[52] U.S. Cl. ......................... 8/527; 8/437;
8/681; 8/687; 8/917; 8/918; 8/919; 106/22;
534/588; 534/594; 534/816; 534/827
[58] Field of Search ............ 8/527; 534/588, 594; 106/22

[56] References Cited

FOREIGN PATENT DOCUMENTS 1465889 3/1977 United Kingdom .

Primary Examiner—A. Lionel Clingman
Attorney, Agent, or Firm—Flynn, Thiel, Boutell & Tanis

[57] ABSTRACT

A dye solution composition containing a black dye obtained by the action of at least one acid or its salt:

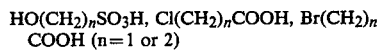

HO(CH$_2$)$_n$SO$_3$H, Cl(CH$_2$)$_n$COOH, Br(CH$_2$)$_n$COOH (n=1 or 2)

on one or a mixture of dyes of the formula (I):

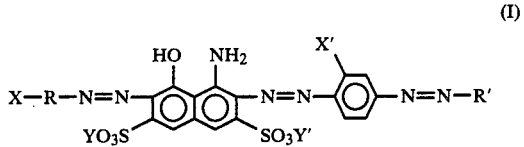

wherein R is phenylene or naphthylene residue; X and X' are each H, sulfonic acid group or sulfonate group; Y and Y' are each H or alkali metal; R' is one of amino group-containing radicals:

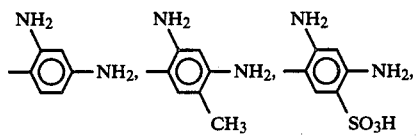

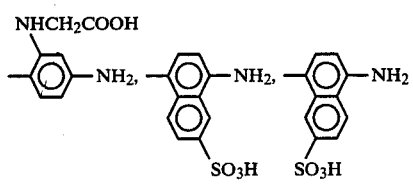

(the carboxyl group may be carboxylate group and the sulfonic acid group may be sulfonate group), except that when R' has not sulfonic acid group, X and X' are not the same and when R' has sulfonic acid group, X and X' are H. This is highly stable, preservative and water soluble, and is useful as ink composition for ball-point pen and ink jet recording.

11 Claims, No Drawings

DYE SOLUTION COMPOSITION

FIELD OF THE INVENTION

This invention relates to stable, high-concentration solution compositions of black direct dyes.

BACKGROUND OF THE INVENTION

It is now a common knowledge that liquid products of dyes are generally advantageous in using as compared with powder products of dyes in many respects, but various difficulties are entailed to obtain the liquid products of dyes. Here, essential requisites required for such liquid-state product are that it contains a substantial content of a dye, namely the dye is of a sufficiently high concentration and that the liquid dye product is stable for a long period of time against the change of the atmospheric temperature, etc. with time and maintains its homogeneity.

Heretofore, various methods have been proposed to prepare liquid-state compositions of anionic dyes, among which direct dyes, particularly, black dyes have generally a low water-solubility. Furthermore, liquid compositions of the black dyes are, when preserved for a long period of time, degraded owing to oxidation, etc. ascribed to the amino group the black dyes have in their molecular structures, and run into undesirable results such as increase in viscosity, lowering in concentration, production of precipitates, etc.

SUMMARY OF THE INVENTION

The present inventors have, therefore, investigated intensively with a view toward developing a black dye which has a good water solubility in weak acidity, neutrality and weak alkalinity and can afford a stable, thick dye solution over a long period of time. As a result, we have accomplished this invention by finding that dyes (hereinafter referred to as "base dyes" of this invention) obtained by causing to act an acid of:

(wherein n is integer of 1 or 2) or its salt on one or a mixture of dyes represented by the general formula (I):

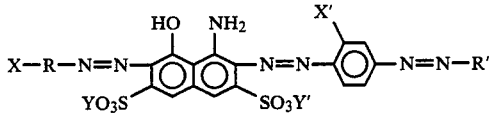

wherein R is phenylene or naphthylene residue; X and X' are each H or sulfonic acid group or sulfonate group; Y and Y' are each H or alkali metal; R' is one radical selected from:

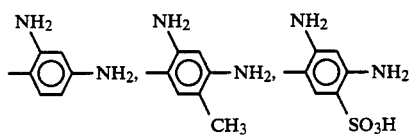

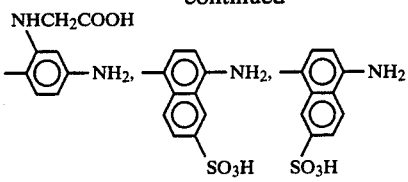

(in which the sulfonic acid group and the carboxyl group may be sulfonate group and carboxylate group, respectively), except that when R' has not a sulfonic acid group, X and X' are not the same and when R' has a sulfonic acid group, X and X' are each H, have a good water solubility in a weak acidity, neutrality and weak alkalinity without impairing the black tone of the starting dyes of formula (I) and that dye solution compositions prepared by using the base dyes thus obtained are stable over a long period of time.

The foregoing advantages of this invention are due to the effect that the active amino group (which is situated in the p-position to the azo radical) in the molecular structure of the starting dyes of formula (I) is converted by the action of the compound of:

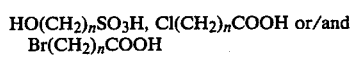

(wherein n is an integer of 1 or 2) into the substituted amino group of:

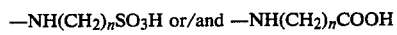

(n is an integer of 1 or 2). As a consequence, degradation of the base dyes is impeded and water solubility is imparted to them.

DESCRIPTION OF THE INVENTION

The method of producing the dyes of formula (I) as a starting material of this invention is described in British Patent Specification No. 1 465 889 in detail.

The reaction between one of the starting dyes and an acid selected from hydroxymethane sulfonic acid, hydroxyethane sulfonic acid, chloroacetic acid, bromoacetic acid, β-chloropropionic acid and β-bromopropionic acid can be readily performed in water or water-containing organic solvent by the addition of sodium bicarbonate or soda ash (sodium carbonate), in neutrality or alkalinity at room temperature or under heating.

The base dyes of this invention produced in this way are prepared into dye solution compositions as intended in a conventional manner. That is, to the thick dye solutions thus obtained or to the dye pastes or powders which are obtained from the dye solutions by separation and purification of the dyes in conventional manner are added water and/or organic hydrophilic solvent, and if required, a surface active agent, defoaming agent, preservative agent, anticorrosive, etc. are further added thereto.

As a water-soluble organic solvent, there may be mentioned, for example, glycols, glycol monoalkyl ethers, isopropyl alcohol, dioxane, dimethylsulfoxide, dimethylformamide, formamide, tetrahydrofuran, dimethylacetamide.

Again, a viscosity-regulating agent such as polyamino or hydroxy compounds, for example, urea, alkyl ureas, dextrin, alkylcelluloses, glycerine, etc. may be added.

A further dye may be incorporated as far as it will not impair the performances of the dye solution compositions according to this invention.

The dye solution compositions with which this invention is concerned not only are useful for dyeing of papers, cotton, linen, silk, leathers, miscellaneous goods, etc., but also can be used as ball-point pen ink.

According to another embodiment of this invention, the dye solution compositions containing the base dyes of this invention can be used preferably as inks for ink jet recording, namely inks which, in recording, are jetted from spout of droplet-forming device as droplets.

In the ink compositions for ink jet recording, the content of the base dyes of this invention varies depending on the kind of solvent used, characteristics required for such inks, etc., but is in the range of 0.5–15%, preferably, 1–10% based on the total weight of the ink composition.

The ink compositions for ink jet recording according to this invention contain water as a major solvent ingredient. Water only or preferably, a mixture of water and a variety of water-soluble organic solvents may be used. As such water-soluble organic solvent, it is preferred to use, for example, polyvalent alcohols such as ethylene glycol, polyethylene glycol; lower alkyl ethers of polyvalent alcohols such as triethylene glycol monomethyl (or ethyl)ether; diethanolamine, triethanolamine, N-methyl-2-pyrrolidone, etc.

The content of the foregoing water-soluble organic solvent in the ink compositions is, based on the total weight of the ink compositions, generally in the range of 10–80%, preferably 15–50%.

The inks for ink jet recording of this invention thus formulated are superior in themselves, but in order to further improve their characteristics known additives may also be added to them.

For instance, a viscosity-regulating agent such as polyvinyl alcohol, cellulose, water-soluble resins; a surface tension-regulating agent, e.g. cation, anion or nonion series surfactants; a metal blocking agent such as EDTA; a mildewproofing agent such as sodium Pyrithionate, dehydroacetic acid, etc.; a specific resistance-regulating agent such as lithium chloride, ammonium chloride, sodium chloride, etc. can be mentioned.

The inks for ink jet recording of this invention have suitable physical properties such as viscosity, surface tension and so on, do not clog the fine spout orifices, afford recording images of sufficiently high chroma, do not cause any change in the physical properties and precipitation of solid contents during preserving, can be recorded on various kinds of materials without limiting the kind of material to be recorded, have a high fixing speed and confer images superior in water resistance, light resistance, wear resistance and resolving power.

The advantages of this invention will be apparent from the following non-limitative examples.

EXAMPLE 1

A black dye, 100 g, containing 40 g of the dye of formula (II):

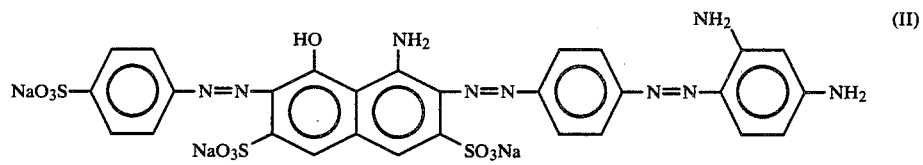

and a diluent (mainly, sodium chloride and anhydrous sodium sulfate) is added to 200 ml of water and the solution is heated at 70°–75° C. After addition of 7 g of soda ash, to the solution is added slowly 5 g of monochloroacetic acid, and the mixture is stirred at 70°–75° C. for 2 hours to result in a deep black aqueous solution. After cooling, the aqueous solution is neutralized to salt-out and filtered to obtain a paste which is in turn purified in a conventional manner to yield 42 g of black dye powder (designated as "Dye A"). The black dye powder, 10 g, is mixed and dissolved in 70 g of water and 30 g of ethylene glycol to prepare a black dye solution. The black solution, when used for dyeing of a paper, colored it deep black and was stable over 6 months.

EXAMPLE 2

A black dye, 100 g, containing 40 g of the dye of formula (II) in Example 1 is added to 200 ml of water and the solution is heated to 70°–75° C. After addition of 7 g of soda ash, 5 g of β-chloropropionic acid is added slowly to the solution and the mixture is stirred for 2.5 hours in alkalinity. Resulting black thick solution is concentrated, dried and purified in a conventional manner to give 42 g of a black dye powder (designated as "Dye B").

The black dye powder, 10 g, is mixed and dissolved in 80 g of water and 20 g of ethylene glycol to obtain a black dye solution. It was stable over 6 months without increase in viscosity.

The black dye powder is prepared into a ball-point pen ink according to the formula:

| | |
|---|---|
| "Dye B" | 8 g |
| Glycerine | 5 g |
| Ethylene glycol | 5 g |
| Diethylene glycol | 10 g |
| "PLYSURF" A 212 E | 0.5 g |
| (Surfactant manufactured by Daiichi Kogyo Seiyaku K. K. in Japan) | |
| Butyl p-oxybenzoate | 0.1 g |
| Water | 71.4 g |

The ink thus prepared was stable over one year.

According to the foregoing compounding formula, an ink was prepared by using the dye of formula (II) instead of the black dye powder (Dye B). It caused gelation in 2 months.

EXAMPLE 3

Crude dye, 100 g, containing 41 g of the dye of formula (III):

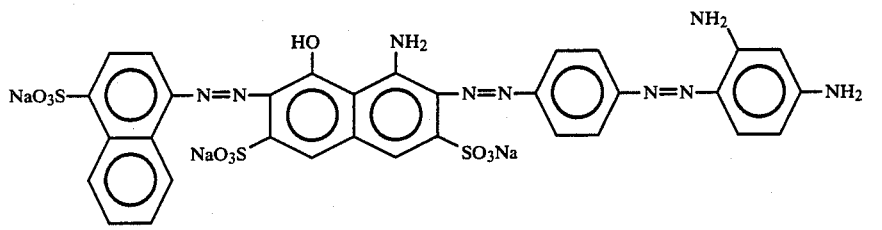

is added to 200 ml of water, and the solution is heated at 50°–55° C. Sodium hydroxymethane sulfonate, 10 g, is added to the solution and the mixture is stirred at 50°–55° C. for 2 hours. After cooling, the reaction mixture is neutralized to salt-out and filtered to obtain a paste. The paste is purified in usual manner to yield 46 g of black dye powder (designated as "Dye C"). The black dye powder, 10 g, is mixed and dissolved in 70 g of water and 30 g of diethylene glycol to give a black dye solution. It was stable over 6 months.

EXAMPLE 4

Crude dye, 100 g, containing 40 g of the dye of formula (IV):

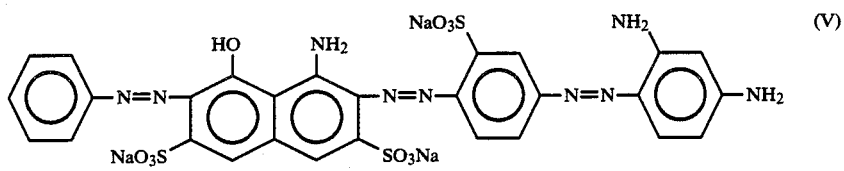

is added to 200 ml of water, and the solution is heated at 70° to 75° C. After addition of 7 g of soda ash, to the solution is added slowly 5 g of monochloroacetic acid, and the mixture is stirred for 2 hours in alkalinity. The resulting black solution is concentrated, dried and purified in a conventional manner to obtain 42 g of black dye powder (designated as "Dye D").

A ball-point pen ink is prepared as follows:

| "Dye D" | 10 g |
|---|---|
| Ethylene glycol | 14 g |
| Water | 62.5 g |
| Thiodiglycol | 13 g |
| Sodium pentachlorophenolate | 0.5 g |

The ink thus prepared was stable over one year.

For comparison purposes, an ink was prepared according to the aforementioned compounding formula by using the dye of formula (IV) instead of "Dye D", but it became thickened in 2 months.

EXAMPLE 5

Crude dye, 100 g, containing 40 g of the dye of formula (V):

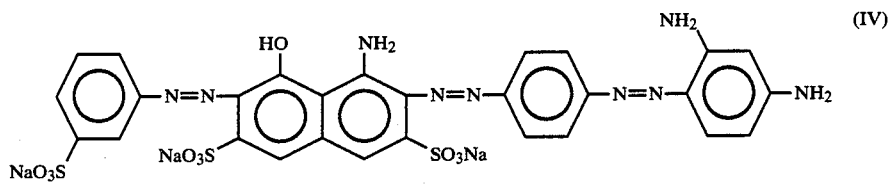

is added to 200 ml of water and the solution is heated at 50°–55° C. Sodium hydroxyethane sulfonate, 10 g, is added to the solution and the mixture is stirred at 50°–55° C. for 2 hours. After cooling, the reaction mixture is neutralized, salt-out and filtered to obtain a paste. The paste is purified in usual manner to obtain 44 g of black dye powder (designated as "Dye E"). The black dye powder, 10 g, is mixed and dissolved in 80 g of water and 20 g of glycerine to obtain a black dye solution which is stable over 6 months.

EXAMPLE 6

Crude dye, 100 g, containing 42 g of the dye of formula (VI):

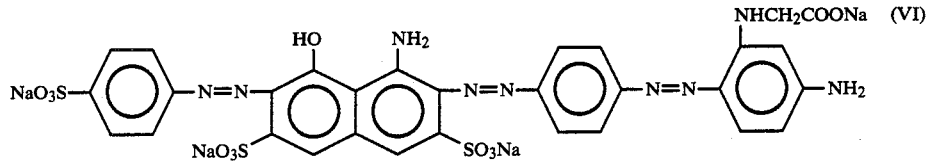

is added to 200 ml of water and the solution is heated at 70°–75° C. After addition of 7 g of soda ash, 3 g of β-bromopropionic acid is slowly added to the solution and the mixture is stirred for 2 hours in alkalinity. The resulting black solution is concentrated, dried and purified in a usual manner to yield 44 g of black dye powder (designated as "Dye F").

This product is useful for the dyeing of papers and pulps and for ball-point pen inks.

EXAMPLE 7

A mixture of 20 g of the dye of formula (VII):

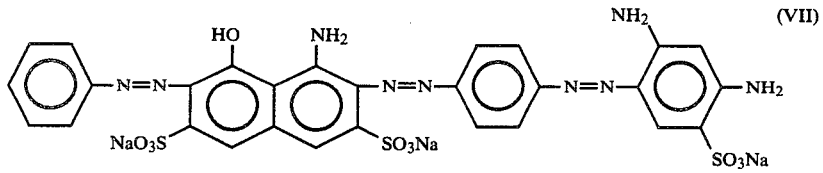

and 21 g of the dye of formula (VIII):

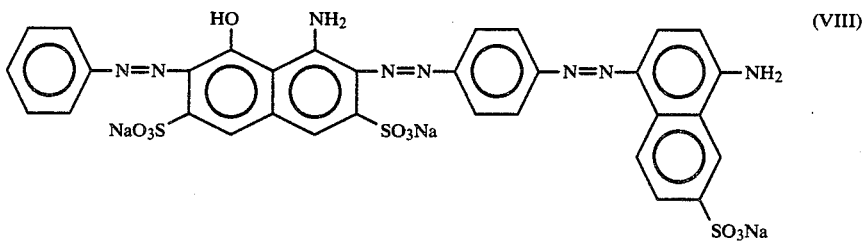

is added to 200 ml of water and the solution is heated to 70°–75° C. After addition of 7 g of soda ash, 5 g of monochloroacetic acid is slowly added and the mixture is stirred for 2 hours in alkalinity. After cooling, it is filtered to obtain a deep black aqueous solution. This is useful for the coloring of papers, pulps and stable over 6 months.

EXAMPLES 8–12

| | parts by weight |
|---|---|
| Example 8 Ink Composition: | |
| "Dye A" | 5 |
| Ion-exchanged water | 65 |
| Sodium dehydroacetate | 0.05 |
| Glycerine | 28 |
| Triethanolamine | 2 |
| Example 9 Ink Composition: | |
| "Dye B" | 5 |
| Ion-exchanged water | 48 |
| Sodium dehydroacetate | 0.05 |
| Diethylene glycol | 30 |
| Polyethylene glycol (#200) | 15 |
| Diethanolamine | 2 |
| Example 10 Ink Composition: | |
| "Dye C" | 5 |
| Ion-exchanged water | 65 |
| Sodium dehydroacetate | 0.05 |
| Glycerine | 28 |
| Triethanolamine | 2 |
| Example 11 Ink Composition: | |
| "Dye D" | 3 |
| Ion-exchanged water | 61.9 |
| Sodium dehydroacetate | 0.05 |
| Diethylene glycol | 20 |
| Polyethylene glycol (#400) | 15 |
| EDTA | 0.1 |
| Example 12 Ink Composition: | |
| "Dye E" | 6 |
| Ion-exchanged water | 48 |
| Sodium dehydroacetate | 0.05 |
| Diethylene glycol | 29 |
| Polyethylene glycol (#300) | 15 |
| Isopropyl alcohol | 2 |

The above-mentioned compositions were each mixed and dissolved thoroughly in respective vessels, filtered under pressurization through a Teflon filter of 0.45 μm in pore size and deaerated by means of a vacuum pump to prepare respective inks.

With the five inks thus obtained, the tests (a)–(d) described below were conducted using a recording device equipped with on-demand type of recording head for ejecting ink by means of a piezoelectric oscillator (ejection orifice diameter: 50 μm, driving voltage of piezoelectric oscillator: 60 V, frequency: 4 KHZ) and yielded good results of them all.

(a) Long-term preservative property of inks:

Each of the inks was sealed tightly in a glass vessel and preserved at −20° C. and 60° C. for 6 months, but any insoluble precipitate was not observed and there were no changes of physical properties and color tone of the solution.

(b) Ejection stability:

Each ink was ejected continuously for 24 hours in the atmospheres of room temperature, 5° C. and 40° C. As a result, recording was taken securely and with high quality from beginning to end under all the conditions.

(c) Ejection responsibility:

Intermittent ejecting at intervals of 2 seconds and ejecting after standing for 2 months were examined. Secure and homogeneous recording was performed without clogging at the orifice tip in both cases.

(d) Quality of recorded images:

Recorded image was deep in chroma and clear. After exposure to indoor light for 3 months, chroma lowering rate of it was less than 1% and it blotted little when dipped in water for 1 minute.

EXAMPLE 13

| | parts by weight |
|---|---|
| "Dye F" | 4 |
| Ion-exchanged water | 49 |
| Sodium dehydroacetate | 0.05 |
| Polyethylene glycol (#200) | 10 |
| Diethylene glycol monobutyl ether | 25 |
| Ethylene glycol | 12 |

An ink composition was prepared from the aforementioned ingredients in a similar manner to Example 8. It was examined with respect to the properties (a) and (b) above similarly to Example 8 employing a recording device fitted with on-demand type multi-head for recording with ink droplets which are formed by imparting thermal energy to the ink within the recording head (ejection orifice diameter: 35 μm, resistance of exothermic resistor: 150Ω, driving voltage: 30 V, frequency: 2 KHZ), and yielded good results.

EXAMPLE 14

The procedure of Example 4 is repeated except that 100 g of crude dye containing 40 g of dye of formula (IX):

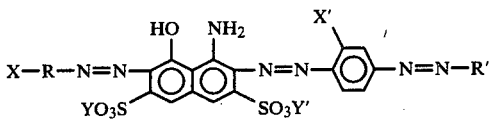
(I)

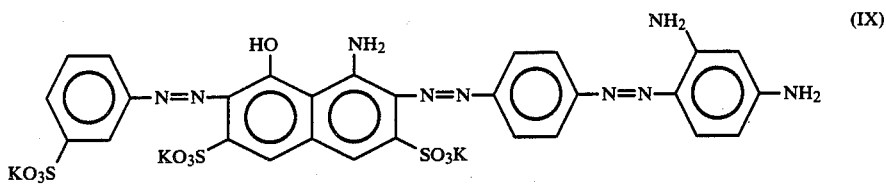
(IX)

instead of dye of formula (IV) is used as a starting material. As a result, 44 g of purified black dye powder is obtained (designated as "Dye G").

This dye powder, 10 g, is prepared, according to the formulation of Example 4, into an ink composition which is stable over more than one year.

EXAMPLE 15

|  | parts by weight |
|---|---|
| "Dye G" | 3 |
| Ion-exchanged water | 61.9 |
| Sodium dehydroacetate | 0.05 |
| Diethylene glycol | 20 |
| Polyethylene glycol (#400) | 15 |
| EDTA | 0.1 |

The aforementioned ingredients are thoroughly mixed and dissolved, filtered under pressurization through a teflon filter of 0.45 μm in pore size and deaerated to prepare an ink. This ink composition was undergone the tests described in Example 8 by means of the recording device in Example 8, and yielded good results comparable to the results of Example 8 with respect to preservative stability, ejection stability, ejection responsibility and recording image.

We claim:

1. A dye solution composition containing a dye obtained by reacting at least one acid selected from the group consisting of:

$OH(CH_2)_nSO_3H$, $Cl(CH_2)_nCOOH$ and $Br(CH_2)_nCOOH$ wherein n is an integer of 1 or 2, or salts thereof, with one or a mixture of dyes represented by the general formula (I):

wherein R is phenylene or naphthylene; X and X' are each H, sulfonic acid or sulfonate; Y and Y' are each H or alkali metal; R' is an amino group-containing radical selected from the group consisting of:

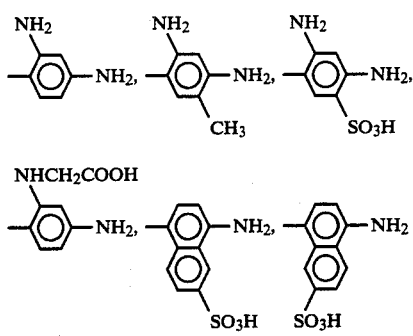

and carboxylates and sulfonates thereof except that when R' does not contain a sulfonic acid group, X and X' are not the same and when R' contains a sulfonic acid group, X and X' are each H.

2. A dye solution composition as claimed in claim 1 wherein X—R— is

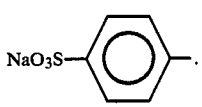

3. A dye solution composition as claimed in claim 1 or claim 2 wherein R' is

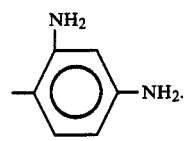

4. A dye solution composition as claimed in claim 1 wherein the dye of formula (I) is a dye represented by the formula:

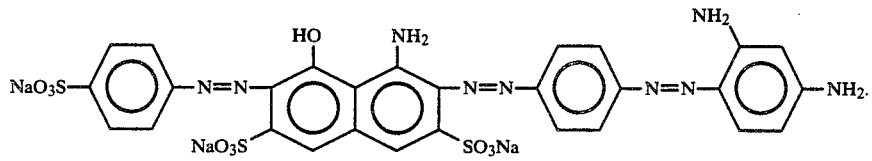

5. A dye solution composition as claimed in claim 1 wherein the dye of formula (I) is a dye represented by the formula:

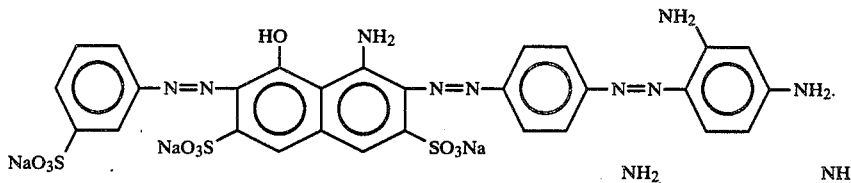

6. A dye solution composition as claimed in claim 1, claim 2, or claim 4 wherein said acid is selected from the group consisting of monochloroacetic acid, β-chloropropionic acid, monobromoacetic acid and β-bromopropionic acid.

7. A dye solution composition as claimed in claim 1 wherein the dye of formula (I) is represented by the formula:

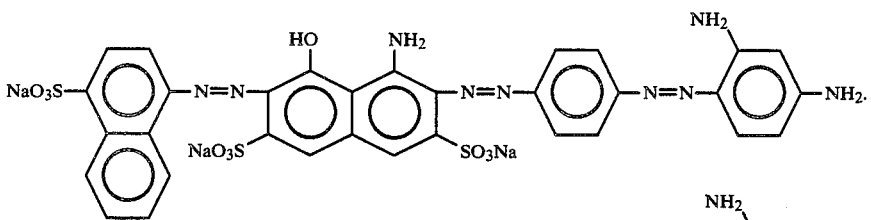

8. A dye solution composition as claimed in claim 1 or claim 7 wherein said acid is sodium hydroxymethane sulfonate or sodium hydroxyethane sulfonate.

9. A dye solution composition containing one or a mixture of dyes having the formula (I)

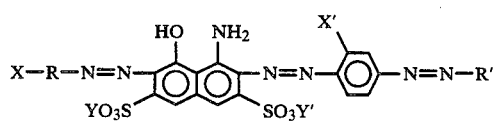

wherein R is phenylene or naphthylene; X and X' each are hydrogen, sulfonic acid or sulfonate; Y and Y' each are hydrogen or alkali metal; R' is selected from the group consisting of

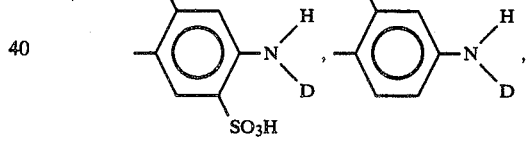

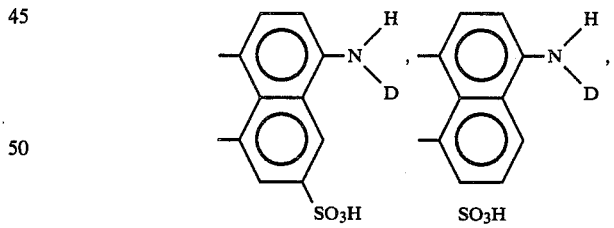

carboxylates and sulfonates thereof, wherein D is $-(CH_2)_nSO_3H$, $-(CH_2)_nCOOH$, or salts thereof, and n is 1 or 2, with the provisos that (1) when R' does not contain a sulfonic acid group, X and X' are not the same, and (2) when R' does contain a sulfonic acid group X and X' are both hydrogen, said composition also containing a solvent.

10. An ink for ink jet recording comprising a dye solution as claimed in claim 1.

11. A dye solution composition as claimed in claim 9 in which the solvent comprises water.

* * * * *